(12) United States Patent
Goyal et al.

(10) Patent No.: US 12,039,781 B2
(45) Date of Patent: Jul. 16, 2024

(54) METHODS AND APPARATUS FOR TARGETED ANALYSIS OF VIDEO IMAGES AND DETECTION OF PERSISTENT CHANGES IN A CAMERA VIEW

(71) Applicant: Verkada Inc., San Mateo, CA (US)

(72) Inventors: Rishabh Goyal, San Mateo, CA (US); Song Cao, Foster City, CA (US); John Peruzzi, San Francisco, CA (US); Yunchao Gong, Los Altos, CA (US)

(73) Assignee: Verkada Inc., San Mateo, CA (US)

( * ) Notice: Subject to any disclaimer, the term of this patent is extended or adjusted under 35 U.S.C. 154(b) by 5 days.

(21) Appl. No.: 18/052,461

(22) Filed: Nov. 3, 2022

(65) Prior Publication Data

US 2024/0153273 A1 May 9, 2024

(51) Int. Cl.
*G06V 20/52* (2022.01)
*G06V 10/25* (2022.01)
*G06V 10/74* (2022.01)

(52) U.S. Cl.
CPC .............. *G06V 20/52* (2022.01); *G06V 10/25* (2022.01); *G06V 10/761* (2022.01)

(58) Field of Classification Search
None
See application file for complete search history.

(56) References Cited

U.S. PATENT DOCUMENTS

| | | | |
|---|---|---|---|
| 11,328,566 B2 * | 5/2022 | Mullins | G08B 13/19652 |
| 2009/0257662 A1 * | 10/2009 | Rudin | G06V 20/52 |
| | | | 382/218 |
| 2012/0027248 A1 * | 2/2012 | Feris | H04N 7/18 |
| | | | 382/103 |
| 2014/0079280 A1 * | 3/2014 | Price | G06F 18/00 |
| | | | 382/103 |
| 2018/0144476 A1 * | 5/2018 | Smith | G06T 7/194 |
| 2019/0096220 A1 * | 3/2019 | Anderholm | G08B 21/0476 |

OTHER PUBLICATIONS

Suzuki et al., "Semantic Change Detection", Nov. 21, 2018, 2018 15th International Conference on Control, Automation, Robotics and Vision, pp. 1785-1790. (Year: 2018).*
St-Charles et al., "SuBSENSE: A Universal Change Detection Method With Local Adaptive Sensitivity" IEEE Transactions on Image Processing, Jan. 2015, 24(1):359-373.

* cited by examiner

*Primary Examiner* — James M Anderson, II
(74) *Attorney, Agent, or Firm* — COOLEY LLP

(57) ABSTRACT

A method for monitoring protected regions of a camera view includes receiving, at a processor of a video camera system, a video stream including a series of video frames depicting at least one scene. A background model is identified based on a predefined representation of at least one region of interest associated with the scene. Each of the video frames is compared to the background model, to define an associated binary mask. A persistent change in the at least one region of interest is detected, based on the binary masks, the persistent change having an associated duration that exceeds a predefined threshold. In response to detecting the persistent change, a change notification message including a video file is generated. The method also includes causing display of the change notification message via a user interface and/or causing transmission of the change notification message to a remote compute device.

20 Claims, 10 Drawing Sheets

Non-Persistent

Flickering lights

Walking past

Persistent

Loitering

Modification/theft /damage

METHODS AND APPARATUS FOR TARGETED ANALYSIS OF VIDEO IMAGES AND DETECTION OF PERSISTENT CHANGES IN A CAMERA VIEW

FIELD

The present disclosure generally relates to video surveillance, and more specifically, to systems and methods for monitoring video streams for persistent changes within a region of interest of a camera view.

BACKGROUND

Image processing techniques exist for performing object detection. Object detection can include the detection of semantic images such as people and license plates. Applications of object detection include, for example, video surveillance and facial recognition.

SUMMARY

In some embodiments, an apparatus includes a processor and a memory operably coupled to the processor, the memory storing instructions to cause the processor to receive a video stream including a series of video frames, and to identify a background model for the video stream based on a predefined representation of at least one region of interest. The memory also stores instructions to cause the processor to compare each video frame from the series of video frames to the background model, to generate a binary mask, from a plurality of binary masks, for each video frame from the series of video frames. The memory also stores instructions to cause the processor to iteratively analyze subsets of binary masks from the plurality of binary masks to detect a persistent change in the at least one region of interest, the persistent change having an associated duration that exceeds a predefined threshold. The memory also stores instructions to cause the processor to, in response to detecting the persistent change in the at least one region of interest, generate a change notification message including (1) at least one of location data associated with the persistent change or temporal data associated with the persistent change, and (2) a video file depicting the persistent change. The memory also stores instructions to cause the processor to cause at least one of: (1) display of the change notification message via a user interface implemented by the processor, or (2) transmission of the change notification message to a remote compute device for display.

In some embodiments, a non-transitory, processor-readable medium stores instructions to cause a processor to receive a video stream including a series of video frames and depicting at least one scene. The processor-readable medium also stores instructions to cause the processor to identify a background model based on a predefined representation of at least one region of interest associated with the scene, and to compare each video frame from the series of video frames to the background model, to define a binary mask, from a plurality of binary masks, for each video frame from the series of video frames. The processor-readable medium also stores instructions to cause the processor to detect, based on the plurality of binary masks, a persistent change in the at least one region of interest, the persistent change having an associated duration that exceeds a predefined threshold. The processor-readable medium also stores instructions to cause the processor to, in response to detecting the persistent change in the at least one region of interest, (1) generate a change notification message including data associated with the persistent change and a video file depicting a visual representation of the persistent change, and (2) cause transmission of a signal to cause display of the change notification via a user interface of a remote compute device.

In some embodiments, a method for monitoring protected regions of a camera view includes receiving, at a processor of a video camera system, a video stream including a series of video frames depicting at least one scene. A background model is identified, via the processor of the video camera system, based on a predefined representation of at least one region of interest associated with the scene. Each video frame from the series of video frames is compared to the background model, to define a binary mask, from a plurality of binary masks, for each video frame from the series of video frames. A persistent change in the at least one region of interest is detected, based on the plurality of binary masks, the persistent change having an associated duration that exceeds a predefined threshold. In response to detecting the persistent change in the at least one region of interest, a change notification message is generated, via the processor of the video camera system, the change notification message including data associated with the persistent change and a video file depicting video associated with the persistent change. The method also includes causing at least one of: (1) display of the change notification message via a user interface operably coupled to the processor, or (2) transmission of the change notification message to a remote compute device.

DETAILED DESCRIPTION

Figure 1:
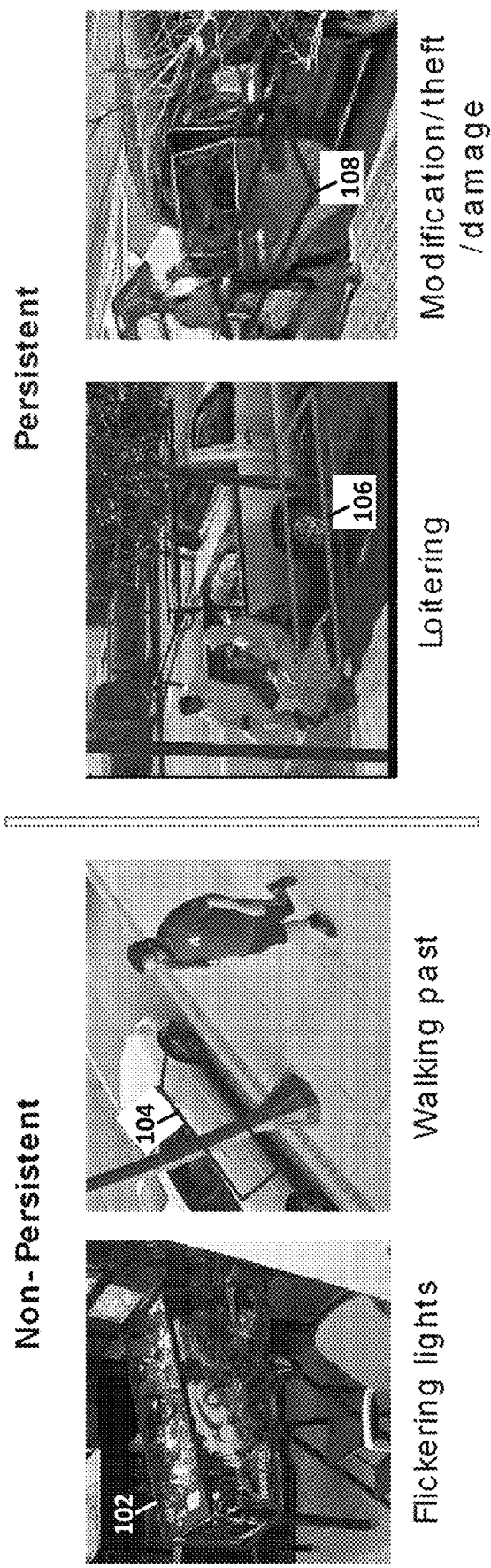
FIG. 1 includes annotated images showing examples of persistent and non-persistent changes in a region of interest for a video stream, according to some embodiments.

Video systems exist that are capable of performing object detection, for example in applications such as facial recognition and license plate recognition. Such systems, however, are not typically interactive (i.e., they do not typically take into account user inputs), and/or do not produce alerts or alarms in response to a particular object being detected. Moreover, many object detection processes are not impacted by a motion or transitory nature of the object being detected. Systems, methods and apparatuses described herein, in contrast, facilitate the detection of persistent changes, or deviations from a previous normal/natural state, within a user-defined area of interest (also referred to herein as a "protected region") in a video-monitored scene, and the production of alerts to the same. For example, in some embodiments, the user-defined area of interest can be defined by a user, prior to the detection of the persistent changes, via one or more graphical drawing tools interacted with by the user via a user interface, such as a graphical user interface (GUI) of a compute device, within a protected regions monitoring system. The one or more graphical drawing tools can include a freeform drawing function by which the user can define one or more regions to be monitored for persistent changes. The compute device can be a local (e.g., onboard) or remote part of a video camera system, and user inputs made via the compute device can be communicated to the video camera system and/or used by the video camera system during its operations, e.g., in the context of one or more video monitoring operations. Once one or more persistent changes within a region of interest have been detected, an alert or alarm may be generated by the video camera system and/or via the video monitoring operations, and communicated to the user and/or to one or more other compute devices. The alert or alarm can be communicated, for example, via a software "dashboard" displayed via a GUI of one or more compute devices operably coupled to or part of the video camera system. The alert or alarm functionality can be referred to as, or as being part of, an "alarm system."

As used herein, a "change" can have an associated sensitivity, which may be user-defined/adjusted and/or automatically defined by a protected regions monitoring system. A deviation of one or more parameters within or beyond the associated sensitivity may register as a change. The one or more parameters can include, by way of non-limiting example, one or more of: a difference in a pixel appearance, a number of pixels in a region, a percentage change in light intensity for a region or pixel(s), an amount of change in light intensity for a region or pixel(s), an amount of change in a direction of light for a region or pixel(s), etc.

As used herein, a "persistent" change can refer to a detected change in the behavior of one or more features, objects, etc., within a monitored video stream and within a predefined region of interest, that persists for longer than a predefined duration, which may be defined by a user via a GUI of the video camera system and/or automatically defined by the video camera system (e.g., using machine learning or other artificial intelligence). For example, the video camera system may be configured also to automatically detect one or more regions within a depicted scene and/or within a field of view of the camera. A persistent change can have an associated duration of seconds, minutes, hours, days, or any other time period of interest.

In some embodiments, the detection of a persistent change is not based on semantic data. Stated another way, the persistent change in a region of interest may be detected irrespective of what type of object is changing within the field of view of the video camera. Any visual change that is persistent within the field of view of the video camera may be flagged. In some such implementations, one or more semantic filters may be applied to down-select from among a plurality of detected persistent changes.

In some embodiments, the processing involved as part of the video monitoring operations occurs at/on a video camera (also referred to herein as an "edge device") itself, such as a security camera/surveillance camera. For example, one or more methods described herein can be implemented in code that is onboard the video camera. The code can include instructions to automatically generate and/or automatically update a background model for detecting portions of a camera view or region of interest thereof that constitute "background" (e.g., portions that are unchanged with respect to a predefined period of time). The background model can include a set/collection of video images. Instructions to update the background model can include instructions to gradually adapt the background model, for example to changes in weather, lighting, and/or the like. In addition, the background model can be updated over time to incorporate new features (e.g., permanent or semi-permanent features, such as buildings, signage, etc.) within the camera view or region of interest. The code can also include instructions to generate and/or output a binary mask that represents background and non-background portions of the camera view or region of interest. Although described herein as including one or more "binary masks," other suitable outputs (e.g., masks that are not binary masks) may also be used.

In some embodiments, abrupt/sudden changes (e.g. changes that occur within, or only within, a brief predefined period of time, such as within seconds or less) are not detected (or identified) by protected regions monitoring systems of the present disclosure as persistent changes. The code can, however, also include instructions to aggregate detected changes over time ("temporal aggregation"), and the aggregated detected changes can eventually be detected as one or more persistent changes, once the aggregated detected changes reach or exceed a predefined threshold (e.g., associated with a particular region of interest). In some implementations, a change of any magnitude and/or of any feature within the camera view or region of interest can be a candidate for persistent change detection, depending on the duration of the observed change. In other implementations, both the duration and the magnitude may be taken into account as part of the video monitoring operations and in determining whether a persistent change has been detected.

In some embodiments, transient motion (e.g., into and then out of a region of interest) is not detected (or identified) by protected regions monitoring systems of the present disclosure as being a persistent change. For example, if a parked car is being monitored by a camera system, and a pedestrian walks by/past the camera (between the camera and the parked car) during a period of time that is shorter than a predefined threshold amount of time, and then no longer appears in the camera view, then the movement of the pedestrian within the camera view may not be detected (or identified) as being a persistent change.

In some embodiments, when a persistent change is detected, a new "normal" definition/representation for the depicted scene (or portion thereof, such as the region of interest) can be defined and stored for future use in the video monitoring operations. For example, a persistent change that includes the installation of a street sign may be incorporated into a background model such that future monitoring will not involve detecting the street sign as a "change."

In some embodiments, a method for detecting persistent changes includes at least one of generating, maintaining, or updating an adaptive background model. As discussed above, the background model can adapt/evolve over time in response to developments occurring within the camera view and/or region of interest. The background model can be based on or include, for example, one or more background subtraction algorithms, such as SuBSENSE or local binary similarity patterns (LSBP) based methods. The background subtraction algorithm(s) can incorporate gradual changes, such as movement of the sun across the sky and associated slow movements of shadows, into the background model. In some implementations, the background model is maintained only for regions of interest (e.g., user-defined regions of interest). The method includes receiving a plurality (e.g., a sequence, such as in a video stream) of video frames as inputs at a processor, and comparing each video frame to the background model. Based on the comparisons of the video frames to the background model, a pixel-wise binary mask (or, in other implementations, a mask that is not a binary mask) is generated and outputted. In the pixel-wise binary mask, an off pixel represents that there was no deviation (change), or no significant deviation, detected (e.g., based on a predefined sensitivity) from background, and an on pixel represents that a significant deviation (change) from background was detected. The method also includes aggregating detected changes over time, and checking for persistence. More specifically, binary masks associated with a most recent plurality frames (e.g., a predefined number of frames, such as 2 frames, 3 frames between 2 and 5 frames, etc.) can be analyzed to determine whether a change detected in a region of interest has persisted for at least a user-defined duration. The method also includes maintaining a queue (or other record, such as a list, table, database, etc.) of the history of received video frames as well as a running average of frames within the queue. When a persistent change is detected, the method can include notifying one or more users, for example by causing display of a change notification message and/or causing transmission of a signal representing a change notification message to one or more compute devices. Detection of a persistent change can also trigger an update to the background model, the update including incorporating the detected persistent change as part of an updated/new background model. Monitoring of additional video frames can continue after the updated background model has been generated, and based on the updated background model.

FIG. 1 includes annotated images showing examples of persistent and non-persistent changes that may be detected within a video stream monitoring a location that includes a region of interest, according to some embodiments. As shown in the left portion of FIG. 1, non-persistent (or transient) changes can include, by way of example, flickering lights within a region of interest 102 that includes a pinball machine, and/or a pedestrian walking past a region of interest 104 that includes a portion of a parked car. As shown in the right portion of FIG. 1, persistent changes can include, for example, individuals loitering in the vicinity of a region of interest 106 that includes a portion of a sidewalk, and/or a modification to, theft from, or damage to a vehicle detected in a region of interest 108 that includes a portion of a parked vehicle.

Figure 2:
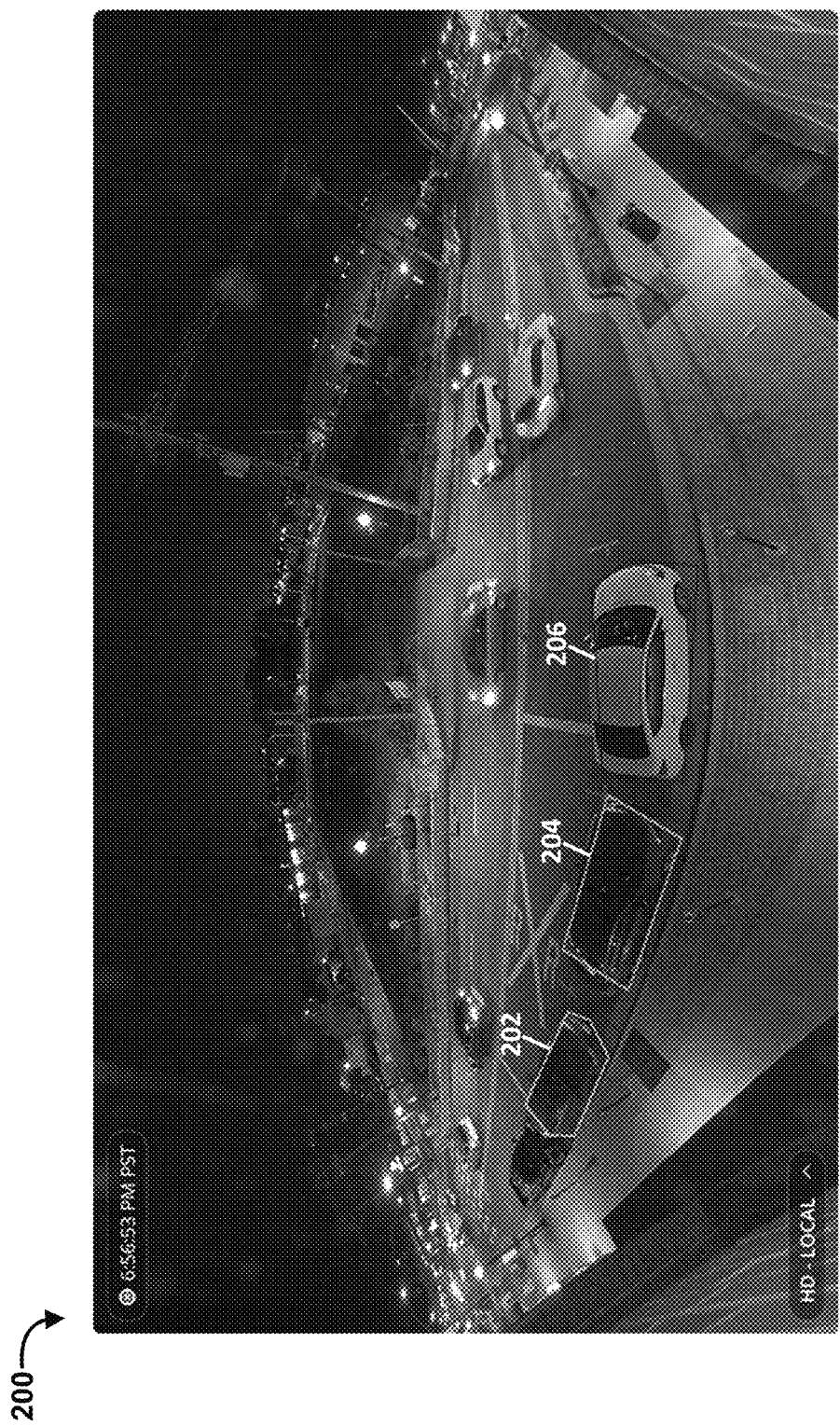
FIGS. 2-4 are annotated images showing example regions of interest for a video stream, according to some embodiments.
Figure 3:
Figure 4:

FIGS. 2-4 are annotated images showing example regions of interest for a video stream, according to some embodiments. For example, FIG. 2 shows three regions of interest—202, 204, and 206—each including an associated parked car within a video camera monitored location. FIG. 3 shows one region of interest (302) that includes a set of building entry doors within a video camera monitored location. FIG. 4 shows three regions of interest—402, 404, and 406—each including an associated inventory storage location within a video camera monitored location.

Figure 5:
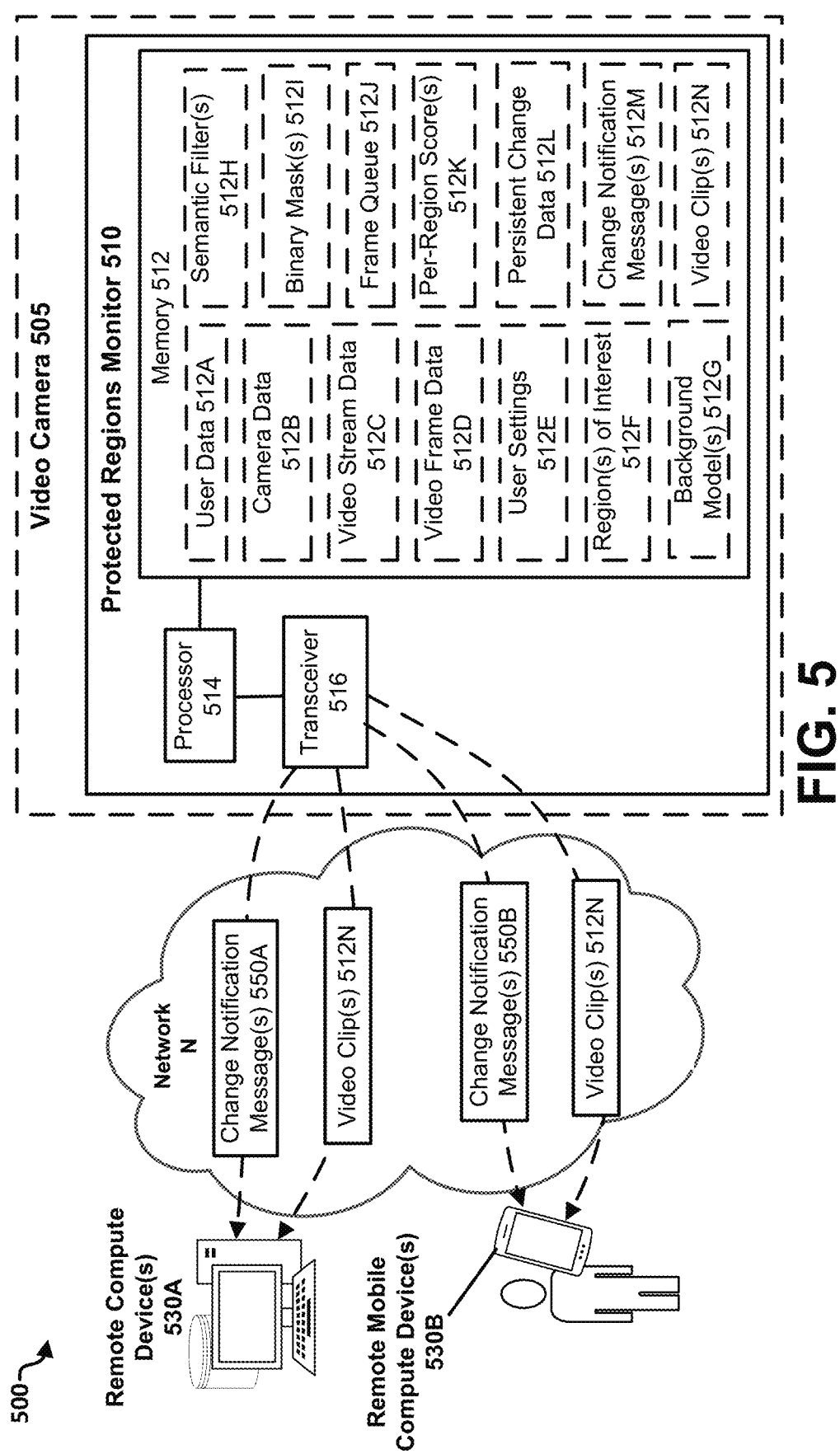
FIG. 5 is a system diagram showing an example implementation of a system for detecting changes within a region of interest for a video stream, according to some embodiments.

FIG. 5 is a system diagram showing an example implementation of a protected regions monitoring system for detecting changes within a region of interest for a video stream, according to some embodiments. As shown in FIG. 5, the protected regions monitor 510 includes a processor 514 operably coupled to a memory 512 and a transceiver 516. The protected regions monitor 510 is optionally located within, co-located with, located on, in communication with, or as part of a video camera 505. The memory 512 stores one or more of user data 512A, camera data 512B, video stream data 512C, video frame data 512D, user settings 512E, region(s) of interest 512F, background model(s) 512G, semantic filter(s) 512H, binary mask(s) 512I, frame queue 512J, per-region score(s) 512K, persistent change data 512L, change notification message(s) 512M, or video clip(s) 512N.

The user data 512A can include, by way of example only, one or more of user identifier(s), user name(s), user location(s), and user credential(s). The camera data 512B can include, by way of example only, one or more of camera model data, camera type, camera setting(s), camera age, and camera location(s). The video stream data 512C can include, by way of example only, one or more of video imagery, date/time information, stream rate, originating internet protocol (IP) address, etc. The video frame data 512D can include, by way of example only, one or more of pixel count, object classification(s), video frame size data, etc. The user settings 512E can be selected by a user and can include, by way of example only, one or more of region(s) of interest, capture frequency, desired frame rate(s), sensitivity/sensitivities (e.g., associated with each from a plurality of parameters), notification frequency preferences, notification type preferences, camera setting preference(s), etc.

The region(s) of interest 512F can include, by way of example only, one or more of a polygonal representation of a portion of a camera field of view, geographical coordinate(s), region of interest name(s), region of interest importance score(s), notification frequency, notification type, etc. The background model(s) 512G can include, by way of example only, one or more of binary mask(s), binary mask identifier(s), date/time information, etc. The semantic filter(s) 512H can include, by way of example only, one or more of text-based labels, phrases, and/or rule set(s). The binary mask(s) 512I can include, by way of example only, one or more of representations of on pixels, representations of off pixels, pixel coordinate(s), and date/time information. The frame queue 512I can include, by way of example only, one or more of video frame data, video frame queue position(s), semantic classification(s), etc. The per-region score(s) 512K can include, by way of example only, one or more of region importance score(s), representation(s) as to whether the region is currently a region of interest, representation(s) as to whether the region was previously a region of interest, and date/time information. The persistent change data 512L can include, by way of example only, one or more of video frame data, video clip(s), change information, change type information, date/time information, etc. The change notification message(s) 512M can include, by way of example only, one or more of an alert, semantic label(s) representing the type(s) of change detected, user contact information (e.g., email address(es), IP address(es), phone number, etc.), video identifier(s), camera identifier(s), etc. The video clip(s) 512N can include, by way of example only, one or more of video data, camera settings, camera identifier(s), and date/time information.

The protected regions monitor 510 and/or the video camera 505 is communicatively coupled, via the transceiver 516 and via a wired or wireless communications network "N," to one or more remote compute devices 530A (e.g., including a processor, memory, and transceiver) such as workstations, desktop computer(s), or servers, and/or to one or more remote mobile compute devices 530B (e.g., including a processor, memory, and transceiver) such as mobile devices (cell phone(s), smartphone(s), laptop computer(s), tablet(s), etc.). During operation of the protected regions monitor 510, and in response to detecting a persistent change, one or more change notification messages can be automatically generated and sent to one or both of the remote compute device(s) 530A and remote mobile compute device(s) 530B. Alternatively or in addition, one or more video clips 512N depicting a detected persistent change can be automatically sent to one or both of the remote compute device(s) 530A and remote mobile compute device(s) 530B in response to detecting the persistent change.

Figure 6:
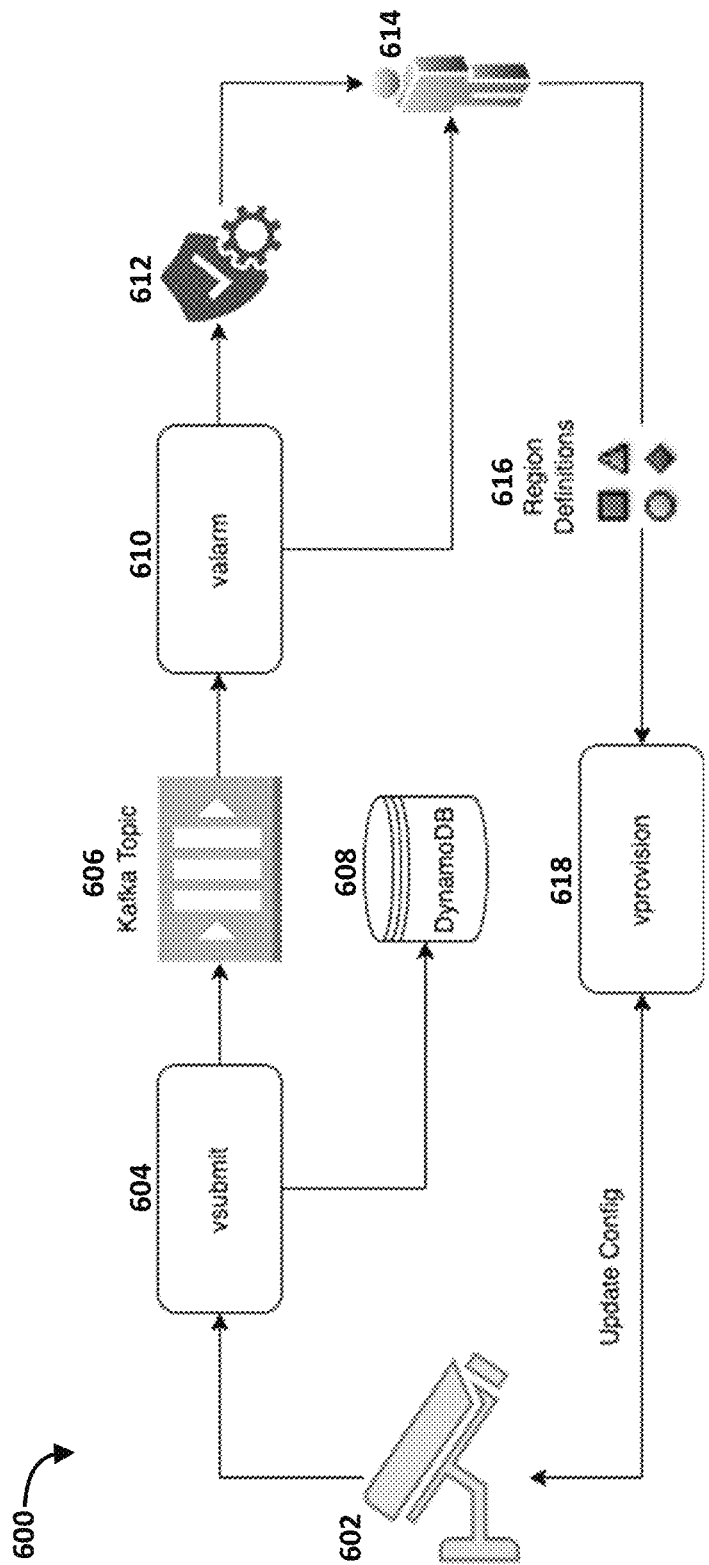
FIG. 6 is a process flow diagram showing a first example process for detecting changes within a user-defined region of interest for a video stream, according to some embodiments.

FIG. 6 is a process flow diagram showing an example process for detecting persistent changes (e.g., within a user-defined region of interest) for a video stream, implementable, for example, using the protected regions monitoring system 500 of FIG. 5, according to some embodiments. As shown in FIG. 6, the process 600 is performed by a video camera 602 that has an associated field of view (referred to herein as a "camera view") that includes software to perform detection of persistent changes in the manner shown. More specifically, video imagery/data is collected via the video camera 602 and portions of the video imagery/data (e.g., portions that are pertinent to a persistent change, such as time of change, region of change, short-duration video clips, etc.) are streamed (604), for example using a submit function 604, as well as logged in an ordered log of events such as a Kafka Topic (where new events are appended to the end of the log as they are received, and all events are retained, even if read, until a configurable deletion time). The streamed video data portions can also be stored in a database 608 (e.g., an Amazon™ Dynamo database). In response to detecting that a persistent change has occurred within the video stream, an alarm can be generated (610), optionally encrypted (612), and sent to or caused to be displayed to a user 614 via a compute device of the user 614. As described elsewhere herein, the detection of the persistent change can be associated with a region of interest defined by the user 614, optionally by drawing a polygon within a GUI depicting a scene/the camera view. The region of interest definitions ("region definitions" 616) can be stored in a provisioning file 618 that is stored within and/or accessible by the video camera 602, and the detection of the persistent change can be based on (or a function of changes within) the region definitions 616. The provisioning file 618 can also include camera configuration information/updates used by the video camera during its operation.

Figure 7:
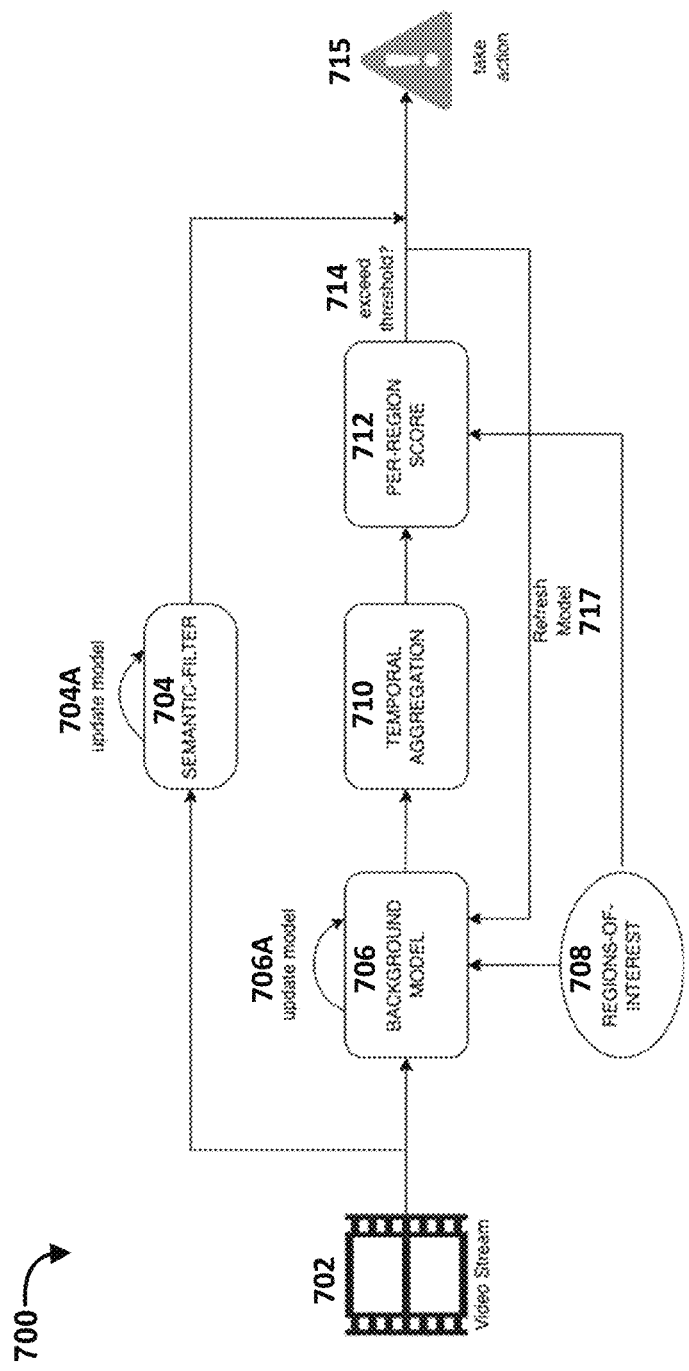
FIG. 7 is a process flow diagram showing a second, detailed example process for detecting changes within a user-defined region of interest for a video stream, according to some embodiments.

FIG. 7 is a process flow diagram showing a second, detailed example process for detecting changes within a user-defined region of interest for a video stream, compatible with the process of FIG. 6 and implementable, for example, using the protected regions monitoring system 500 of FIG. 5, according to some embodiments. As shown in FIG. 7, the method 700 includes receiving (e.g., at a video camera or at a compute device operably coupled to a video camera) a video stream 702 and comparing the received video stream 702 to a background model 706, thereby generating comparison data (e.g., including binary mask data). The background model can include one or more predefined regions of interest 708 (e.g., user-defined and/or automatically defined by the protected regions monitoring system). The background model is optionally updated at 706A based on the received video stream 702. At 710, a temporal aggregation of the comparison data is performed, and at 712, a per-region score is assigned to each predefined region of interest (of which there may be one or multiple) based on the temporally aggregated comparison data and, optionally, based on the predefined regions of interest 708. In some implementations, one or more semantic filters 704 may also be applied, to filter detected changes (e.g., the absence of lighting changes when lighting changes are expected, or the presence of lighting changes when none are expected), and the semantic filters 704 can be updated (704A), for example in response to the video stream 702 and/or user input. For each predefined region of interest determined at 714 to have a per-region score that exceeds a predefined threshold, a persistent change is deemed to have occurred, and in response, one or more actions may be taken at 715. The one or more actions taken at 715 can include, but are not limited to, generating and/or sending one or more change notification messages associated with the persistent change, causing display of one or more change notification messages associated with the persistent change, generating one or more video clips associated with the persistent change, sending one or more video clips associated with the persistent change, and causing display of one or more video clips associated with the persistent change. Data associated with the persistent change can also be used to refresh/update the background model 706, at 717. Although steps are shown and described in FIG. 7 as occurring in a particular sequence, other sequences, including those in which multiple steps are performed concurrently or overlapping in time, are also contemplated. For example, the background model 706 may be updated at 706A overlapping in time with receiving additional streamed video 702 and/or with the temporal aggregation 710 of additional comparison data. Alternatively or in addition, the background model 706 may be updated at 706A overlapping in time with updating the semantic filed 704 at 704A.

In some embodiments, a method for detecting changes within a user-defined region of interest for a video stream includes receiving at least two inputs: a video stream and a representation of one or more regions of interest. A background subtraction is performed on the input video stream, for example using an adaptive background subtraction algorithm such as SuBSENSE, thereby generating a plurality of binary (foreground/background) masks. The binary masks are maintained in a queue and temporally aggregated. A running average may be calculated as the queue is populated. The temporally aggregated binary masks are analyzed to detect a persistent change, for example based on a predefined (optionally user-defined) persistence of change (e.g., a minimum duration for a change to quality as "persistent") and/or model sensitivity. The predefined persistence of change and/or the model sensitivity can be reconfigurable, including while the method is performed. One or more semantic filters can be applied as part of the analysis. The one or more semantic filters can include a collection of models or a unified model that can rationalize, or identify reasons for, any of a variety of different combinations of semantic changes, such as the presence of structural changes, the presence of people, the absence of animals, and/or the like.

Figure 8:
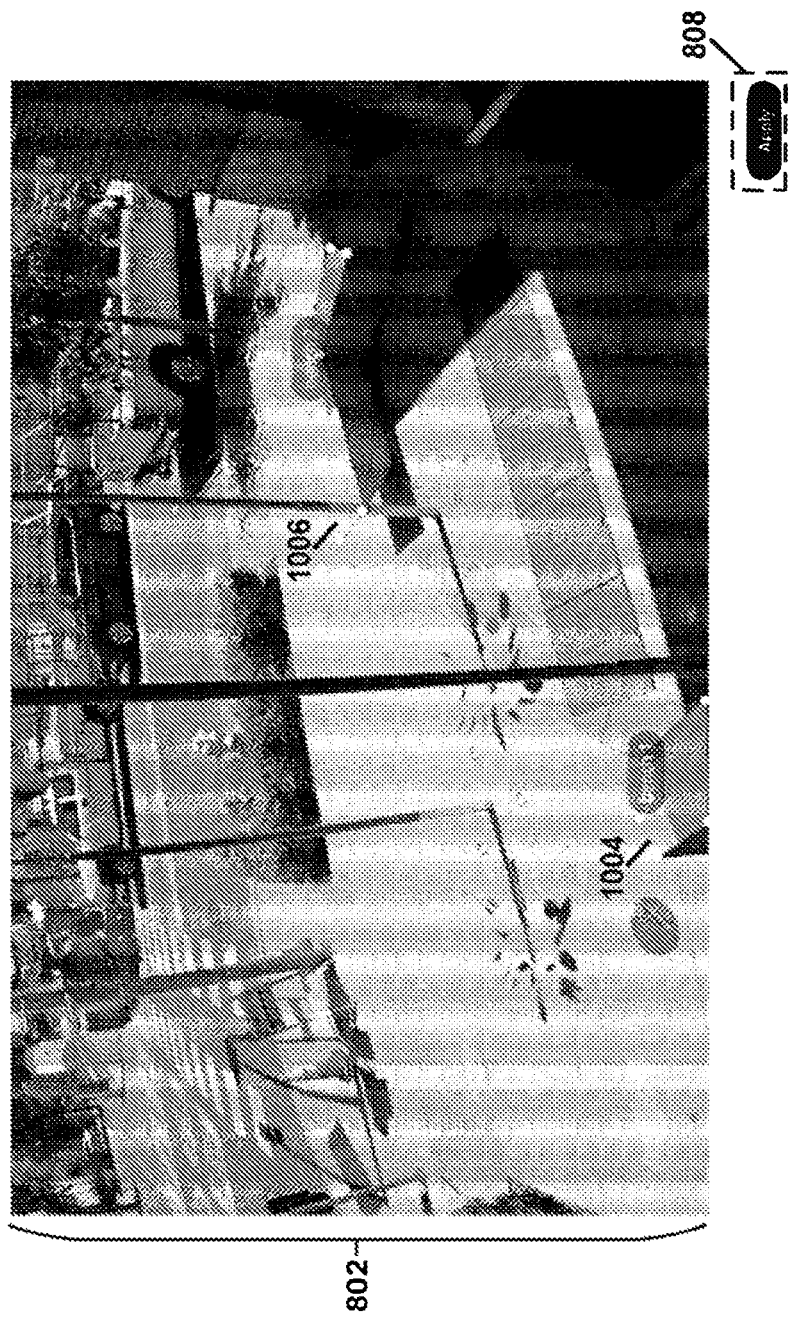
FIG. 8 shows a first example user interface in which a user has drawn a region of interest ("protected region"), according to some embodiments.

FIG. 8 shows a first example user interface in which a user has drawn two regions of interest ("protected regions"), according to some embodiments. As shown in FIG. 8, a first region of interest 804 (labelled "bench 1") has a first polygonal shape and a second region of interest 806 (labelled "bench 2") has a second polygonal shape different from the first polygonal shape. Each of the polygonal shapes was "drawn" on a video image 802 via a GUI by a user, in a free-form manner, and the labels were also input by the user via the GUI. The user interface of FIG. 8 also includes a user-selectable "Apply" button 808 that, when selected, captures the user's annotations by storing them in a memory operably coupled to a video camera.

Figure 9:
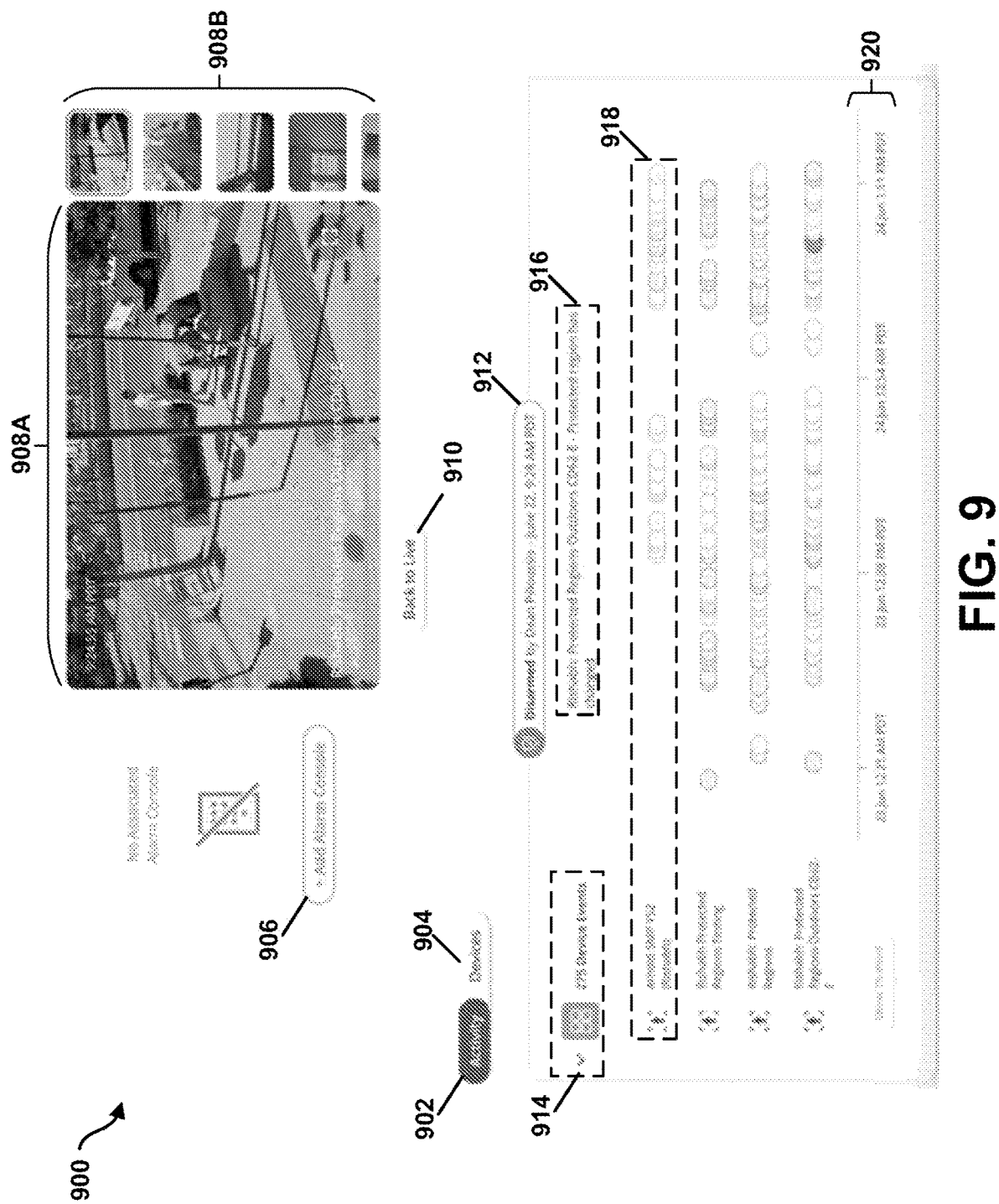
FIG. 9 shows a second example user interface in which the user is alerted to sufficiently persistent changes within the region of interest of FIG. 8, according to some embodiments.

FIG. 9 shows a second example user interface in which the user is alerted, via a dashboard-type display 900, to sufficiently persistent changes within the second region of interest 806 (labelled "bench 2") of FIG. 8. As can be seen in the image 908A, individuals are seated on "bench 2," and the presence of the individuals within the second region of interest 806 has been detected as a persistent change (e.g., because the individuals have been present within the second region of interest 806 for a duration exceeding the user's predefined persistence of change duration). In response to detecting the persistent change, a notification is sent to a compute device of the user, containing information about which region changed and at what time. In parallel with or overlapping in time with the notification, the video clip 908A centered around the persistent change is also sent to a compute device of the user or caused to be displayed via a compute device of the user. In addition, a plurality of additional video clips 908B, which may include depictions of other persistent changes detected in other regions of interest and/or depictions of other monitored areas of a video camera network (including multiple video cameras). Alternatively or in addition, the video clip 908A (and, optionally, the plurality of additional video clips 908B) can be included with the notification. In some implementations, the plurality of additional video clips 908B may be dynamically updated (e.g., with some or all of the additional video clips 908B being replaced with new additional video clips depicting persistent changes with higher associated scores), in real-time or substantially in real-time. The plurality of additional video clips 908B can be regarded as a video clip "queue," optionally arranged in an order for sequential viewing by the user. The display 900 also includes an option 906 to add an alarm console for viewing one or more of: live feeds from one or more cameras, recent events related to a network of cameras (e.g., security events, alerts, detected activity, etc.), device statuses (e.g., camera statuses), and/or a user-selectable panic button. The display 900 also includes a user-toggleable slider/switch for switching between viewing Activity details (902) and viewing details about Devices (904). The display 900 also includes a user-selectable button 910 to switch from playing the video clip 908A to a live video camera feed. A tally of device events 914, an alarm status notification with date/time information 912, and an alert 916 are also presented via the display 900. A list of users is also presented, in an arrangement of rows (e.g., row 918), each row including a user name and graphical representations of alerts/detected persistent changes over time relative to a time/date axis 920.

Figure 10:
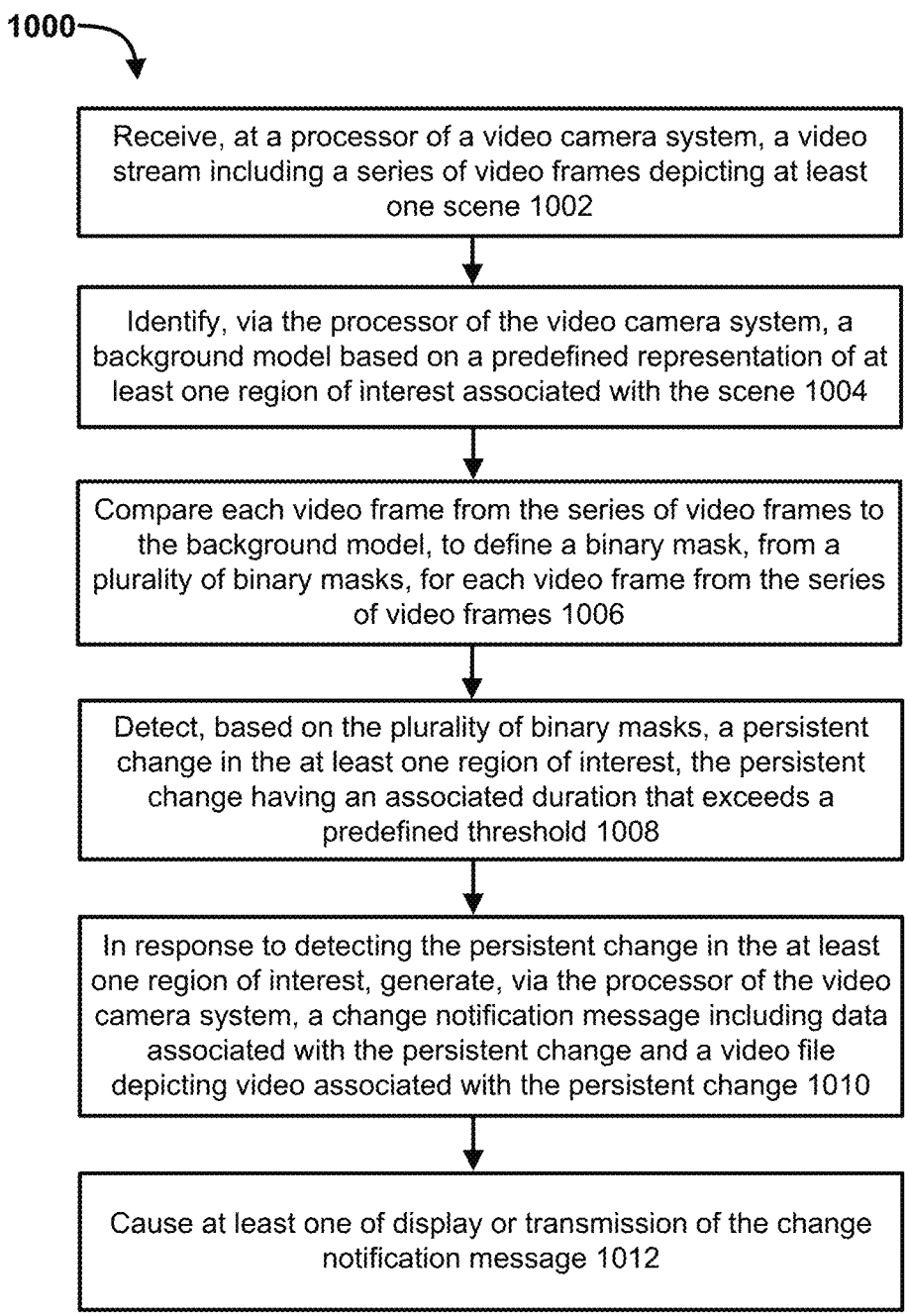
FIG. 10 is a flow diagram showing a method for detecting a persistent change within a region of interest and generating a change notification based on the detected persistent change, according to some embodiments.

FIG. 10 is a flow diagram showing a method for detecting a persistent change within a region of interest and generating a change notification based on the detected persistent change, according to some embodiments. The method 1000 of FIG. 10 can be implemented, for example, using the protected regions monitoring 500 of FIG. 5. As shown in FIG. 10, the method 1000 includes receiving, at 1002, at a processor of a video camera system, a video stream including a series of video frames depicting at least one scene. The series of video frames can include consecutive video frames and/or non-consecutive video frames. At 1004, a background model is identified, via the processor of the video camera system, based on a predefined representation of at least one region of interest associated with the scene. The method 1000 also includes comparing each video frame from the series of video frames to the background model, at 1006, to define a binary mask, from a plurality of binary masks, for each video frame from the series of video frames. At 1008, a persistent change is detected in the at least one region of interest, based on the plurality of binary masks, the persistent change having an associated duration that exceeds a predefined threshold. At 1010, and in response to detecting the persistent change in the at least one region of interest, a change notification message is generated, via the processor of the video camera system. The change notification message includes data associated with the persistent change and a video file depicting video associated with the persistent change. At 1012, the method 1000 includes causing at least one of: (1) display of the change notification message via a user interface operably coupled to the processor, or (2) transmission of the change notification message to a remote compute device.

In some implementations, detecting the persistent change in the at least one region of interest at 1008 is further based on at least one semantic filter. Alternatively or in addition, in some implementations, the method 1000 also includes updating the background model to include the persistent change, in response to detecting the persistent change. Alternatively or in addition, in some implementations, the method 1000 also includes receiving a user input including an indication of the at least one region of interest in the form, for example, of a freeform polygon. Alternatively or in addition, in some implementations, the method 1000 also includes receiving a user input including an indication of a threshold persistence value, the detecting the persistent change in the at least one region of interest further based on the threshold persistence value.

In some embodiments, an apparatus for detecting persistent changes in a video stream includes a processor and a memory operably coupled to the processor. The memory stores instructions to cause the processor to receive a video stream including a series of video frames, and to identify a background model for the video stream, for example based on a predefined representation of at least one region of interest. Each video frame from the series of video frames is compared to the background model, to generate a binary mask, from a plurality of binary masks, for each video frame from the series of video frames. The memory also stores instructions to cause the processor to iteratively analyze subsets of binary masks from the plurality of binary masks to detect a persistent change in the at least one region of interest, the persistent change having an associated duration that exceeds a predefined threshold. The memory also stores instructions to cause the processor to generate a change notification message in response to detecting the persistent change in the at least one region of interest. The change notification message includes at least one of location data associated with the persistent change or temporal data associated with the persistent change, and a video file depicting the persistent change. The memory also stores instructions to cause the processor to cause at least one of: (1) display of the change notification message via a user interface implemented by the processor, or (2) transmission of the change notification message to a remote compute device for display. In some implementations, the apparatus also includes a video camera operably coupled to the processor and/or to the memory, the video stream being generated by the video camera.

In some embodiments, the user interface is a first user interface, the remote compute device includes a second user interface, and the memory further storing instructions to cause the processor to receive a user input including an indication of the at least one region of interest. The user input can include a graphical selection (e.g., a polygon) made (e.g., drawn) by a user via one of the first user interface or the second user interface. For example, the graphical selection can include a freeform polygon.

In some implementations, the memory also stores instructions to cause the processor to automatically define the at least one region of interest, which is not based on a user input. Alternatively or in addition, in some implementations, the detecting the persistent change in the at least one region of interest is also based on at least one semantic filter. Alternatively or in addition, in some implementations, the memory also stores instructions to cause the processor to update the background model to include the persistent change. Alternatively or in addition, in some implementations, the persistent change is detected based on at least one subset of binary masks from the subsets of binary masks, when temporally aggregated, exhibiting at least one of: (1) a number of changes exceeding a predefined threshold number of changes, (2) an amount of change exceeding a predefined threshold amount of change, (3) a time period over which at least one change occurs exceeding a predefined threshold time period over which at least one change occurs, and/or (4) a time period over which a change persists exceeding a predefined threshold time period over which a change persists. In some implementations, the background model includes a plurality of images.

In some embodiments, a non-transitory, processor-readable medium stores instructions to cause a processor to receive a video stream including a series of video frames and depicting at least one scene, and to identify a background model based on a predefined representation of at least one region of interest associated with the scene. The non-transitory, processor-readable medium also stores instructions to compare each video frame from the series of video frames to the background model, to define a binary mask, from a plurality of binary masks, for each video frame from the series of video frames. The non-transitory, processor-readable medium also stores instructions to detect, based on the plurality of binary masks, a persistent change in the at least one region of interest, the persistent change having an associated duration that exceeds a predefined threshold. The non-transitory, processor-readable medium also stores instructions to generate a change notification message in response to detecting the persistent change in the at least one region of interest. The change notification message can include data associated with the persistent change and a video file depicting a visual representation of the persistent change. The non-transitory, processor-readable medium also stores instructions to cause transmission of a signal, in response to detecting the persistent change in the at least one region of interest, to cause display of the change notification via a user interface of a remote compute device.

In some implementations, the non-transitory, processor-readable medium also stores instructions to cause the processor to receive a user input including a representation of the at least one region of interest, the representation of the at least one region of interest including a freeform polygon drawn by a user. Alternatively or in addition, in some implementations, the instructions to cause the processor to detect the persistent change in the at least one region of interest include instructions to detect the persistent change in the at least one region of interest based on at least one semantic filter. Alternatively or in addition, in some implementations, the non-transitory, processor-readable medium also stores instructions to cause the processor to update the background model to include the persistent change, in response to detecting the persistent change. Alternatively or in addition, in some implementations, the instructions to cause the processor to detect the persistent change in the at least one region of interest include instructions to detect the persistent change in the at least one region of interest based on a temporal aggregation of the plurality of binary masks. Alternatively or in addition, in some implementations, the instructions to cause the processor to detect the persistent change in the at least one region of interest include instructions to detect the persistent change in the at least one region of interest based on at least one of: a predefined threshold number of changes, a predefined threshold amount of change, a predefined threshold time period over which at least one change occurs, or a predefined threshold time period over which a change persists.

In some embodiments, regions of interest as described herein may be monitored according to a predefined schedule (e.g., at specific times during a given day, on specific days of the week, at specific times during the year, at a predefined frequency, etc.). In some example implementations, significant features of video-monitored scenes, such as vehicles, entryways/doors, safes and/or the like may be monitored, and associated persistent changes may be detected, in a fully or partially automated manner (e.g., at intermittent or otherwise predefined intervals) and/or may be designated/labelled as "protected" (i.e., as regions of interest) with or without user consent. In other example implementations, change persistence may be automatically determined for each region of interest (whether user-defined or defined by the protected regions monitoring system), for example by computing visual variability of the region of interest and by taking into account scene dynamics.

Systems and methods set forth herein may be integrated, by way of example, into one or more an alarm systems, human-in-the-loop verification services, etc. In some implementations, any of a variety of different user-configurable semantic filters can be included/used.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations or equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus, comprising:
a processor; and
a memory operably coupled to the processor, the memory storing instructions to cause the processor to:
receive a video stream including a series of video frames;
identify a background model for the video stream based on a predefined representation of at least one region of interest;
compare each video frame from the series of video frames to the background model, to generate a binary mask, from a plurality of binary masks, for each video frame from the series of video frames;

iteratively analyze subsets of binary masks from the plurality of binary masks to detect a persistent change in the at least one region of interest, the persistent change having an associated duration that exceeds a predefined threshold;

in response to detecting the persistent change in the at least one region of interest, generate a change notification message including:

at least one of location data associated with the persistent change or temporal data associated with the persistent change, and a video file depicting the persistent change; and cause at least one of: (1) display of the change notification message via a user interface implemented by the processor, or (2) transmission of the change notification message to a remote compute device for display.

2. The apparatus of claim 1, further comprising a video camera operably coupled to the processor, the video stream being generated by the video camera.

3. The apparatus of claim 1, wherein the user interface is a first user interface and the remote compute device includes a second user interface, the memory further storing instructions to cause the processor to receive a user input including an indication of the at least one region of interest, the user input including a graphical selection made by a user via one of the first user interface or the second user interface.

4. The apparatus of claim 3, wherein the graphical selection includes a freeform polygon.

5. The apparatus of claim 1, wherein the memory further stores instructions to cause the processor to automatically define the at least one region of interest, the at least one region of interest is not based on a user input.

6. The apparatus of claim 1, wherein the detecting the persistent change in the at least one region of interest is further based on at least one semantic filter.

7. The apparatus of claim 1, wherein the memory further stores instructions to cause the processor to update the background model to include the persistent change.

8. The apparatus of claim 1, wherein the persistent change is detected based on at least one subset of binary masks from the subsets of binary masks, when temporally aggregated, exhibiting at least one of: a number of changes exceeding a predefined threshold number of changes, an amount of change exceeding a predefined threshold amount of change, a time period over which at least one change occurs exceeding a predefined threshold time period over which at least one change occurs, or a time period over which a change persists exceeding a predefined threshold time period over which a change persists.

9. The apparatus of claim 1, wherein the background model includes a plurality of images.

10. A non-transitory, processor-readable medium storing instructions to cause a processor to:

receive a video stream including a series of video frames and depicting at least one scene;

identify a background model based on a predefined representation of at least one region of interest associated with the scene;

compare each video frame from the series of video frames to the background model, to define a binary mask, from a plurality of binary masks, for each video frame from the series of video frames;

detect, based on the plurality of binary masks, a persistent change in the at least one region of interest, the persistent change having an associated duration that exceeds a predefined threshold; and in response to detecting the persistent change in the at least one region of interest:

generate a change notification message including data associated with the persistent change and a video file depicting a visual representation of the persistent change; and cause transmission of a signal to cause display of the change notification via a user interface of a remote compute device.

11. The non-transitory, processor-readable medium of claim 10, further storing instructions to cause the processor to receive a user input including a representation of the at least one region of interest, the representation of the at least one region of interest including a freeform polygon drawn by a user.

12. The non-transitory, processor-readable medium of claim 10, wherein the instructions to cause the processor to detect the persistent change in the at least one region of interest include instructions to detect the persistent change in the at least one region of interest based on at least one semantic filter.

13. The non-transitory, processor-readable medium of claim 10, further storing instructions to cause the processor to update the background model to include the persistent change, in response to detecting the persistent change.

14. The non-transitory, processor-readable medium of claim 10, wherein the instructions to cause the processor to detect the persistent change in the at least one region of interest include instructions to detect the persistent change in the at least one region of interest based on a temporal aggregation of the plurality of binary masks.

15. The non-transitory, processor-readable medium of claim 10, wherein the instructions to cause the processor to detect the persistent change in the at least one region of interest include instructions to detect the persistent change in the at least one region of interest based on at least one of: a predefined threshold number of changes, a predefined threshold amount of change, a predefined threshold time period over which at least one change occurs, or a predefined threshold time period over which a change persists.

16. A method comprising:

receiving, at a processor of a video camera system, a video stream including a series of video frames depicting at least one scene;

identifying, via the processor of the video camera system, a background model based on a predefined representation of at least one region of interest associated with the scene;

comparing each video frame from the series of video frames to the background model, to define a binary mask, from a plurality of binary masks, for each video frame from the series of video frames;

detecting, based on the plurality of binary masks, a persistent change in the at least one region of interest, the persistent change having an associated duration that exceeds a predefined threshold;

in response to detecting the persistent change in the at least one region of interest, generating, via the processor of the video camera system, a change notification message including data associated with the persistent change and a video file depicting video associated with the persistent change; and causing at least one of: (1) display of the change notification message via a user interface operably coupled to the processor, or (2) transmission of the change notification message to a remote compute device.

17. The method of claim 16, wherein the detecting the persistent change in the at least one region of interest is further based on at least one semantic filter.

18. The method of claim 16, further comprising updating the background model to include the persistent change, in response to detecting the persistent change.

19. The method of claim 16, further comprising receiving a user input including an indication of the at least one region of interest, the user input including a freeform polygon.

20. The method of claim 16, further comprising receiving a user input including an indication of a threshold persistence value, the detecting the persistent change in the at least one region of interest further based on the threshold persistence value.

* * * * *

UNITED STATES PATENT AND TRADEMARK OFFICE
CERTIFICATE OF CORRECTION

PATENT NO. : 12,039,781 B2
APPLICATION NO. : 18/052461
DATED : July 16, 2024
INVENTOR(S) : Rishabh Goyal et al.

It is certified that error appears in the above-identified patent and that said Letters Patent is hereby corrected as shown below:

In the Specification

Column 6, Line 47, delete "The frame queue 512I can include, by way of example only," and insert -- The frame queue 512J can include, by way of example only, --

In the Claims

Column 17, Line 61, (Claim 10), delete "with the scene;" and insert -- with at least one scene; --

Column 18, Line 11, (Claim 10), delete "change notification via a user interface of a remote" and insert -- change notification message via a user interface of a remote --

Column 18, Line 51, (Claim 16), delete "the scene;" and insert -- the at least one scene --

Signed and Sealed this
First Day of October, 2024

Katherine Kelly Vidal
Director of the United States Patent and Trademark Office